United States Patent [19]

Jedlicka et al.

[11] Patent Number: 4,486,645
[45] Date of Patent: Dec. 4, 1984

[54] PROCESS FOR REMOVING PACKAGING MATERIALS FROM PACKAGED PRODUCTS

[75] Inventors: Glen J. Jedlicka, Scottsdale; Curtis L. Baker, Phoenix, both of Ariz.

[73] Assignee: Armour Food Company, Omaha, Nebr.

[21] Appl. No.: 297,392

[22] Filed: Aug. 28, 1981

Related U.S. Application Data

[63] Continuation-in-part of Ser. No. 165,511, Jul. 3, 1980, abandoned.

[51] Int. Cl.³ .............................................. B23K 27/00
[52] U.S. Cl. ........................ 219/121 LN; 219/121 LG; 426/518
[58] Field of Search .................. 219/121 LJ, 121 LH, 219/121 LG, 121 LN, 121 L, 121 LM; 426/245, 248, 518

[56] References Cited

U.S. PATENT DOCUMENTS

| | | | |
|---|---|---|---|
| 2,627,466 | 2/1953 | Lewis | 426/389 |
| 3,464,534 | 9/1969 | Muncheryan | 219/121 LH |
| 3,642,007 | 2/1972 | Roberts | 128/395 |
| 3,659,613 | 5/1972 | Bredemier | 128/395 |
| 3,787,873 | 1/1974 | Sato et al. | 219/121 LJ X |
| 3,790,744 | 2/1974 | Bowen | 219/121 J |
| 3,910,276 | 10/1975 | Polyani | 128/395 |
| 3,953,706 | 4/1976 | Harris | 219/121 LH |
| 3,997,964 | 12/1976 | Holbrook | 219/121 LH |
| 4,081,654 | 3/1978 | Mracek | 219/121 LH |
| 4,190,854 | 2/1980 | Redfern | 219/121 LH |
| 4,323,757 | 4/1982 | Oka et al. | 219/121 LG X |

FOREIGN PATENT DOCUMENTS

| | | | |
|---|---|---|---|
| 2258872 | 9/1975 | France | 128/395 |
| 2305936 | 12/1976 | France | 426/237 |
| 1558595 | 1/1980 | United Kingdom | 219/121 LG |
| 555570 | 11/1977 | U.S.S.R. | 128/395 |

OTHER PUBLICATIONS

Nivens, *Western Electric Technical Digest*, "Laser Beam Wire Stripping Machine", No. 56, pp. 19 & 20, Oct. 1979.
Anon, *Electronics*, "Laser Strip Wire Insulation", vol. 49, No. 19, pp. 50, 52, Sep. 16, 1976 McGraw-Hill Inc.
Medical & Biol. Engng., vol. 8, No. 6, 1970, pp. 541–548.
Electronics Dulberger et al., pp. 54–57.

*Primary Examiner*—C. L. Albritton
*Attorney, Agent, or Firm*—Willian Brinks Olds Hofer Gilson & Lione Ltd.

[57] ABSTRACT

A method of removing cellulose casings from sausages without causing damage to the sausages. The method employs a continuous laser beam having a wavelength ranging from 1 to 15 microns, at an applied energy density ranging from 20 to 60 joules per square centimeter. The sausages are transported beneath the laser beam, which is focused nominally at the surface of the sausages at a focal length ranging from 6.3 to 15 centimeters. Alternatively, the laser beam may be focused nominally at the longitudinal center of the sausages, with the laser beam having a focal length ranging from 6.3 to 15 centimeters. As each sausage is moved beneath the laser beam, the cellulose casing is vaporized to create an elongated slit in the casing. The casing is then pulled from the sausage.

11 Claims, 4 Drawing Figures

4,486,645

PROCESS FOR REMOVING PACKAGING MATERIALS FROM PACKAGED PRODUCTS

CROSS REFERENCE TO RELATED APPLICATIONS

This application is a continuation-in-part of application Ser. No. 06/165,511 filed on July 3, 1980 by the applicants herein, which has now been abandoned.

BACKGROUND OF THE INVENTION

1. Field of the Invention

The present invention relates generally to packaging processes, and, more particularly, to a process for the removal of packaging material from heat-sensitive food products. Specifically, the preferred embodiment of this invention relates to a process wherein sausage casings are split from end-to-end with a laser beam to allow ready removal of the casing without accompanying surface damage to the sausage.

2. Description of the Prior Art

In the past, sausage products were commercially prepared by stuffing or blowing a meat emulsion into a carbon-based casing. The casing retained the sausage shape during cooking. The casing material, which most often was cellulose, was removed from the sausage after the cooking process to produce a fully edible product. The removal was usually accomplished by cutting or splitting the casing along the length of the sausage with a knife, and then mechanically stripping the casing away from the meat. It the cutting blade was not precisely adjusted, the sausage was also cut, leaving unsightly and undesirable marks on the meat surface. Frequent replacement of the knife blade and adjustment of the cut depth were regarded in the industry as necessary expenses. A need existed for a method of consistently splitting sausage casings without damaging the contained sausage product.

A particularly good example of the problems encountered when cutting a casing with a knife or razor was to be found in the manufacture of some hot dogs. A meat emulsion was prepared and blown into a cellulose casing material. The hot dogs were then formed into the well-known, rounded-end cylindrical shape using a "linker" which produced a connected "string" of the sausages. The strings of hot dogs were hung on a "stick" and passed through an oven where they were cooked. Following cooking, the cellulose casing was removed or "peeled" from each hot dog by feeding the string of hot dogs through a peeler. The peeler had a cutting blade appropriately mounted so as to slice each casing as the hot dog passed longitudinally beneath the blade. When the cutting blade was precisely adjusted, the resulting cut did not extend to the portions of the casing covering the rounded ends of the sausages. As each hot dog exited the peeler, a mechanical device pulled the continuous casing away from the hot dogs, leaving the hot dogs ready for display packaging. The casing removal operation required that the casing be continuously split across the length of the hot dog. When the string of hot dogs was fed through the peeler at high speed, the hot dogs bounced as they passed below the knife. Peeler cuts resulted in some areas, while other areas of the casing remained uncut. When the uncut portions of the casings were substantial, the casing removal device often malfunctioned and resulted in a string of the hot dogs passing through the peeler with the casings partially split but still in place. The subsequent manual removal of the casings was inordinately expensive. A need existed for a method of consistently splitting hot dog casings from end-to-end without damaging the hot dogs notwithstanding size, shape or movement peculiarities of individual hot dogs.

Since contamination of the sausage product was an ever-present danger, a need existed for a casing removal method which minimized or eliminated contact of a blade with the sausage.

As evidenced by U.S. Pat. No. 2,627,466, an attempt had been made some 30 years ago to solve the problem of peeler cuts on hot dogs. The method there disclosed utilized a soluble casing material, which was at least partially dissolved from the hot dog during or after the cooking process. While peeler cuts were avoided, that process presented other problems, including the relatively greater cost of the casing material and the requirement that the hot dogs be washed and dried prior to packaging. A need continued to exist for a method to mechanically remove conventional cellulose-based hot dog or sausage casings.

Many diverse uses for lasers have been developed in recent years, including hole drilling, welding, material removal, cutting, scribing, sealing and trimming of a variety of organic and inorganic materials. The lasers which have received the most attention to date are the ruby, neodymium-doped glass, neodymium-doped yttrium aluminum garnet and carbon dioxide types, although many others are also amenable to such applications. Certain applications, such as hole drilling, preferably utilize pulsed lasers, whereas other applications, for example welding and cutting, are best accomplished with continuous wave lasers.

The projection or focusing of a laser beam onto an absorbtive body resulted in transformation of the radiant energy into heat energy. Thus, as illustrated by French Pat. No. 2,305,936, the expected application of a laser to a heat-sensitive food product would be for cutting or slicing through the product by thermally vaporizing a path through the product. That patent gives rise to an expectation that the projection of a laser beam onto a protein-based product such as a hot dog would result in at least a de-naturing of irradiated protein molecules. A need continued to exist for an apparatus or process to provide automated removal of a casing from a heat-sensitive food product without slicing into, slicing through, or otherwise degrading the product.

SUMMARY OF THE INVENTION

We have discovered that if a conventional sausage peeler blade is replaced by a laser beam which will vaporize the casing material, hot dogs and other sausage products can be rapidly and safely peeled without causing significant damage to the resulting product.

Accordingly, one objective of the present invention is to teach a method of removing casings from hot dogs and other sausage-like food products without leaving unsightly and undesirable peeler cuts on the surface of the product.

Yet another objective of the present invention is to provide a process by which sausage-like food products may be peeled faster and more efficiently than is possible with conventional peelers.

Still another objective of the present invention is to provide a process by which carbon-based packaging materials may be rapidly and conveniently removed from heat-sensitive food products without significantly damaging the food product.

A further object of the invention is to improve sanitation in the process of removing sausage casings.

DESCRIPTION OF THE PREFERRED EMBODIMENTS

In accordance with one embodiment of this invention, a method of removing a carbon-based casing, such as cellulose, from a sausage is disclosed, comprising the steps of longitudinally transporting a string of linked sausages beneath a laser beam which has an applied energy density in the range of 20 to 60 joules per square centimeter to vaporize an elongated slit in the casing; and pulling the casing from the sausage.

The foregoing and other objects, features and advantages will be apparent from the following, more particular, description of the preferred embodiments of the invention, as illustrated in the accompanying drawings.

THE SPECIFICATION

Figure 1:
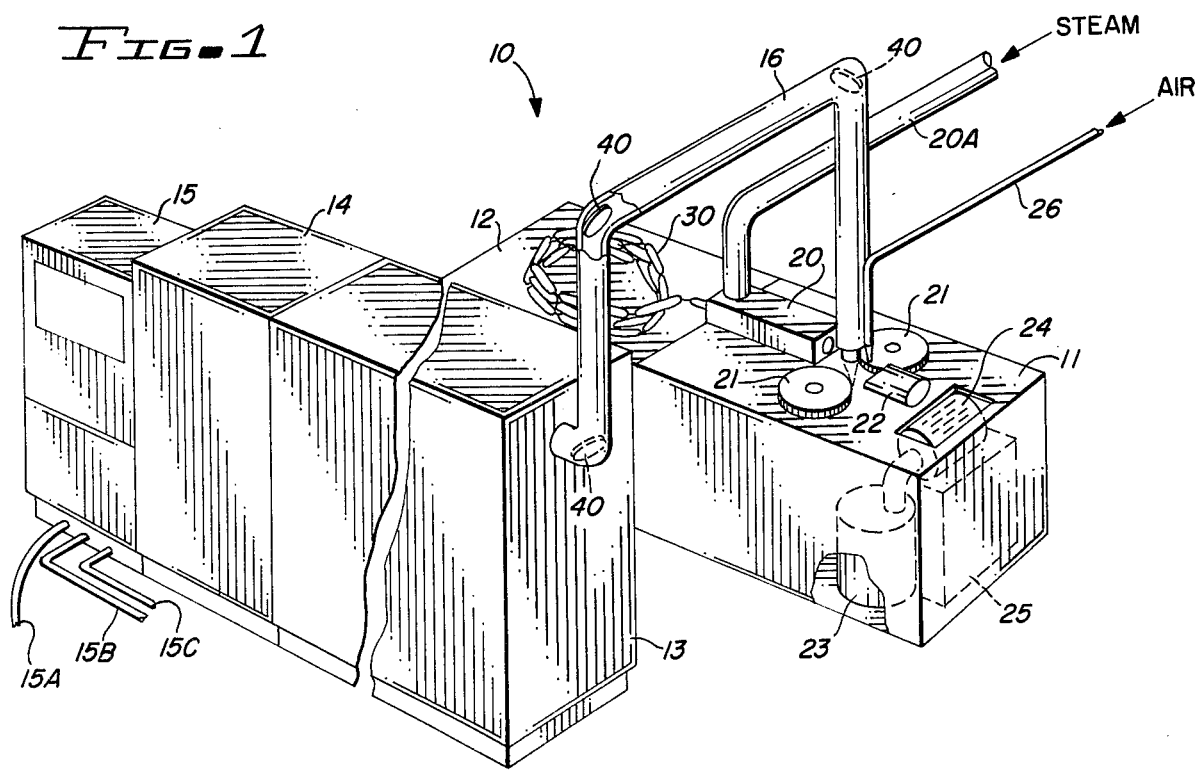
FIG. 1 is a perspective view of one embodiment of the apparatus used in this invention.

In FIG. 1 of the Drawings, a perspective view of one embodiment of the apparatus used to practice this invention is shown generally by reference number 10. The apparatus 10 is comprised of a sausage peeler 11, a sausage table 12, a laser generator 13, a laser power supply 14, a laser controller 15, and a projection pipe 16 for projecting a laser beam from the laser generator 13 to the cutting area of the sausage peeler 11. The controller 15 has electrical input line 15A, cooling fluid input line 15B, and carbon-dioxide gas input line 15C for the input of carbon-dioxide gas needed to generate the laser beam.

The peeler 11 has a steamer 20 with attached steam line 20A, which softens the sausage casings before they are cut and helps guide the sausages into the cutting area. The peeler 11 also has drive wheels 21 to draw the string of sausages 30 through the steamer 20 into the cutting area of the peeler 11. Also shown is a guide 22, vacuum pump 23, vacuum wheel 24, scrap bin 25, and gas jet line 26. The projection pipe 16 has elbow mirrors 40 which reflect the laser beam through bends in the projection pipe 16.

Figure 2:
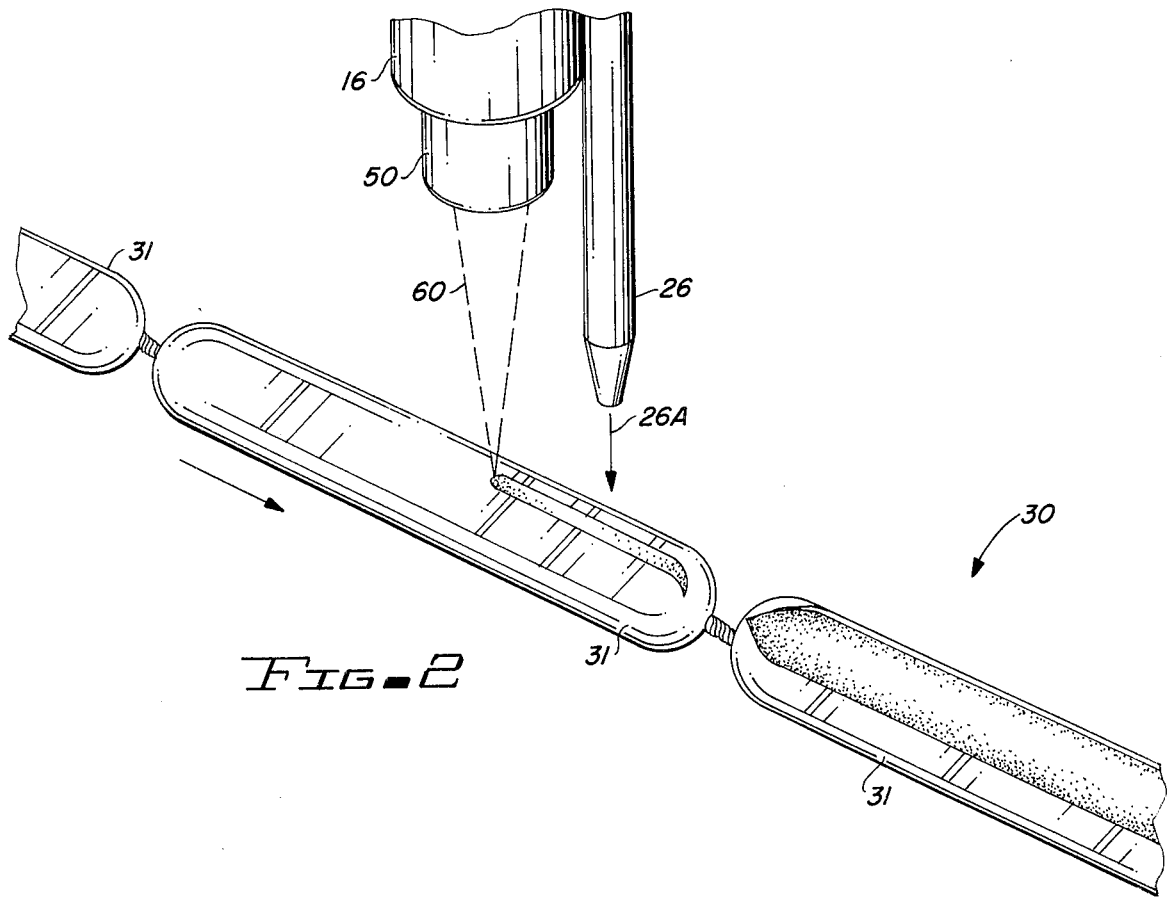
FIG. 2 is a perspective view of a portion of the apparatus used in this invention, showing a close-up of the cutting area of the apparatus having a laser beam in juxtaposition with linked sausages.

FIG. 2 is a perspective view showing a close-up of the cutting area of the peeler 11. Shown in the terminus of the projection pipe 16 with attached adjustable optics focusing mechanism 50, for focusing the laser beam 60 onto the upper surface of links in the sausage string 30; which creates a slit in casings 31, extending from the front rounded end of each sausage, longitudinally across the top surface thereof, and down the rear rounded end of each sausage. A gas jet 26A emanates from gas jet line 26, separating the casings 31 along the split.

Figure 3:
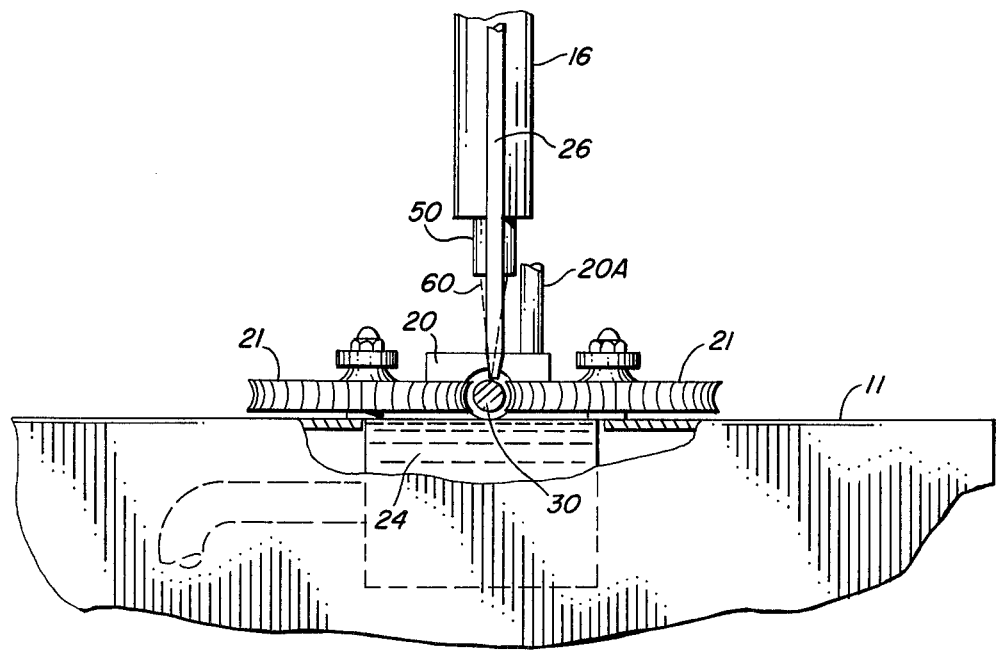
FIG. 3 is a front elevational view of a portion of the apparatus used in this invention.

FIG. 3 is a front elevational view of the peeler 11, showing how drive wheels 21 pull the string of sausages 30 into the path of the laser beam 60.

Figure 4:
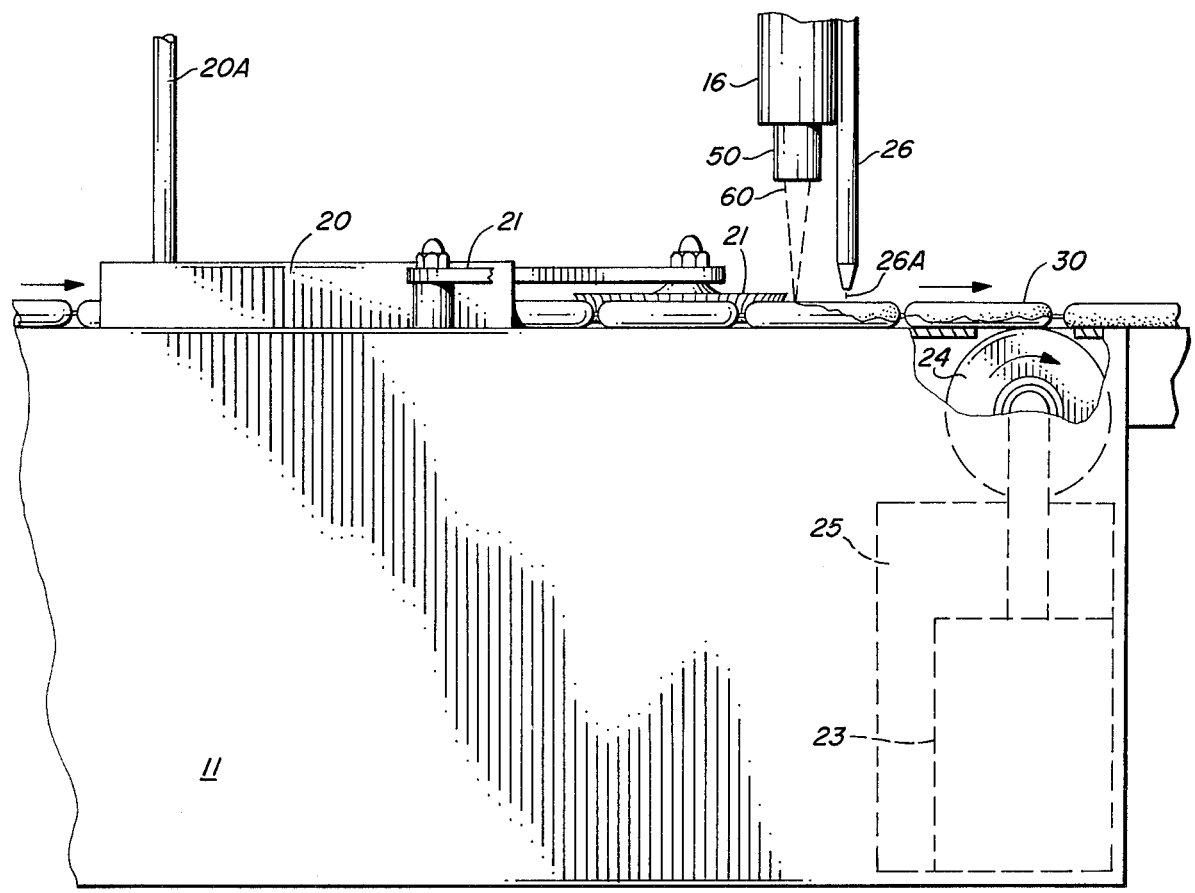
FIG. 4 is a side elevational view of a portion of the apparatus used in this invention.

FIG. 4 is a side elevational view of the peeler 11, showing how the string of sausages 30 are pulled through the steamer 20 into the path of the laser beam 60; showing how the casings 31 are separated by the gas jet 26A after being cut by the laser beam; and showing how the split casings are pulled from the sausage links by vacuum wheel 24 into the scrap bin 25.

The present invention concerns our discovery that a carbon-based packaging material may be completely or partially removed from a product contained therein by irradiating the packaging material with a beam of laser-generated infrared radiation for a period of time which is long enough to vaporize the packaging material, but which is short enough to prevent significant damage from occurring to the product. Any remaining packaging material may then be separated by other suitable means. The invention is particularly applicable to heat-sensitive food products. Examples of such products are hot dogs and sausages which must be separated from a carbon-based casing prior to packaging for sale. Although the process can be used to completely vaporize a package from any food product, a particularly advantageous application involves the end-to-end splitting of cellulose hot dog or sausage casings, which can then be removed from the product with a conventional mechanical device, such as the vacuum wheel 24 shown in FIGS. 1, 3 and 4 of the Drawings The effect which a laser beam has on a substance will depend on many factors, including the wave length of the radiation, the power or wattage of the radiation and the nature of the radiation, i.e. pulsed or continuous waves. Carbon-based organic materials such as cellulose and plastic absorb energy from infrared radiation, and if sufficient energy is absorbed, the material will melt or vaporize. To achieve this result, the infrared radiation will preferably be in the range of 1–15 microns, and more preferably in the range of 6–12 microns. It has been found that the 10.6 micron wavelength beam produced by a $CO_2$ laser is virtually completely absorbed by organic materials such as cellulose and plastic.

Continuous wave laser radiation provides a steady flow of energy to the irradiated surface, whereas pulsed laser deliver bursts of energy at various intervals. Although certain pulsed lasers which deliver infrared radiation would be suitable to perform the process of the present invention, continuous wave lasers are preferable because their sustained energy delivery results in a uniform cutting of the packaging material.

Successful operation of the laser-irradiation process to split or remove a casing from a product is critically dependent upon several interrelated factors, including the wavelength of the radiation, the power delivered by the beam, the projected area of the beam and the speed with which the beam travels upon the surface of the casing being split or removed. Additionally, where the package or casing is to be removed from a three-dimensional surface, the focal configuration of the beam also gains significance, as hereafter explained.

The wavelength of the laser beam must be selected to correspond to the particular casing material being removed. For example, where the casing is the commonly encountered cellulose of plastic type of material, a carbon dioxide laser, which typically has a wavelength of 10.6 microns, is particularly suitable. That suitability arises from the fact that the 10.6 micron wavelength is in the infra-red range, and typical organic material such as cellulose and plastic exhibit virtual opacity to radiation in the infra-red range. Thus by properly timing the duration of the projection of the beam upon the surface, it is possible to deliver sufficient energy to the casing being irradiated to melt, vaporize or burn away a local region. By traversing the beam over the surface, a line or split can be vaporized while leaving the underlying body undamaged.

The actual power output required from the laser device is inversely related to both the area upon which the beam is projected and the dwell time of the beam upon that area. The vaporization of the casing occurs after sufficient energy has been absorbed, so that the larger the area to be vaporized, the greater the power delivery required from the laser. It is possible to irradiate the entire surface of the object to be peeled, and thereby produce a sausage, hot dog or other item which is ready for immediate display packaging. However, the practical considerations involved in the fabrication of lasers, including the current cost of such devices, dictate that the preferred system as disclosed here utilizes the laser to simply split the casing upon a sausage or hot dog, with the actual removal of the casing being effected by a conventional mechanical device.

Where the casing is to be ultimately removed by another mechanism, the projected area of the beam need only be large enough to define a clean break in the casing. It has been found that an area of projection, taken in a plane normal to the axis of the projection, formed by a beam having a diameter in the range of 100 microns to 2.5 mm. is workable for splitting a casing upon a sausage or hot dog. A beam having a diameter in the range of 250 microns to 1 mm. is preferred as hereafter explained.

Having selected a desired width of the slit to be made in the casing, the power output of the laser and the travel speed of the beam upon the surface of the casing can be determined as inversely dependent variables. The critical parameter is the actual energy delivered per unit area, and it is believed that an actual energy delivery to the surface of the casing of about 20 to 60 Joules per square centimeter is adequate to cleanly vaporize a slit without damaging the underlying hot dog.

By a proper arrangement of the focal characteristics of the laser, an unexpected benefit can also be gained in that the casing can be reliably split along the cylindrical body of the sausage and can be at least partially split from the rounded ends of the sausage without damaging the surface of either the ends or the interior regions of the sausage. To achieve such a result, the laser is focused through a relatively long focal length nominally upon the surface of the cylindrical body of the sausage. Thus the depth of field for the cutting operation is sufficient to not only adjust to movement of the hot dog, but also to provide a cut which "wraps" around the end of the sausage to a previously unattainable degree. The resulting consistent splitting of the casing virtually eliminates problems in the casing removal operations.

In the alternative, the casing can be split around the end of the sausage to approximately the longitudinal axis of the hot dog by focusing the laser beam at the center of the sausage. As the leading end of the hot dog first encounters the impinging center-focused beam, the elongated projection of the beam upon the skewed and rounded end portion of the sausage reduces the energy density while the focal action produces a coincidental region of maximum concentration of energy. The maximized concentration of the beam cooperates with the elongated projection of the beam to maintain the incident energy density within the range wherein the casing is vaporized, but the underlying sausage remains unaffected. As the beam progresses along the sausage, the irradiated region of the casing is shifted away from the focus of the beam but the surface of the sausage assumes a perpendicular orientation with respect to the beam. Thus, even as the energy density tends to increase due to a minimization of the incident area, a concomitant reduction in the energy density results from the shift of the region of incidence away from the focus of the beam. The net result is that the energy applied per unit area remains in a range where the casing is vaporized but the sausage is unaffected. Thusly is an unexpected result provided wherein the casing enclosing the sausage may be continuously split from end-to-end without damaging the sausage itself.

A wide range of energies, limited only by practical considerations, will be suitable to practice the present invention. For example, a 3-watt laser beam could eventually vaporize a packaging material if the material were exposed to it for a sufficient period of time. Conversely, an extremely strong laser beam having a power in excess of 1500 watts would also be suitable if the exposure were brief enough and the beam width were wide enough, as hereinafter explained in more detail. However, such laser powers are extreme and powers of 100–1500 watts are preferable, with powers in the range of 250–600 watts being especially preferred.

For purposes of the present invention, we have found that focal lengths of about 6.3 to about 51 cm. are preferred, with a focal length of about 25 cm. being especially preferred. When focal lengths within this range are selected, beam widths of from 100 microns to 2.5 mm. will be suitable, with beam widths of 250 microns to 1 mm. being preferred. At a focal length of 25.4 cm., a beam width of 635 microns is obtained.

In addition to these factors, the length of time during which the beam contacts the packaging material is extremely important. If, at a given beam power, the time of exposure is too short, insufficient cutting will result whereas, if the time of exposure is too great, the product itself may be damaged. The manner in which the packaging material is moved relative to a beam of laser radiation can be handled in a variety of ways. For example, the packaged product can be moved beneath the laser beam so that the beam vaporizes a strip of packaging material without damaging the product. Alternatively, the packaged product can remain stationary and the laser beam can be moved in relation to it, or both the beam and the packaged product can be moved in relation to one another. For hot dogs and sausage products, we have found it preferable to pass the encased products under the beam at such a rate that the casing is vaporized but the product remains unaffected.

The present invention will be particularly valuable in a commercial setting. Although a single laser generator may supply laser energy to one work station, one generator will preferably be used to provide suitable beams of energy to a plurality of work stations. This may be accomplished by increasing the power output of the generator and fragmenting the beam with a beam splitter so that an appropriate amount of energy is delivered to each work station. In this way, the cost of supplying the required energy to each work station will be substantially reduced.

The following example is illustrative of the subject invention.

EXAMPLE 1

The cutting blade of a conventional sausage or hot dog peeler was removed and focusing apparatus was placed approximately 25 cm. above a plane representing the upper surface of hot dogs to be passed through the peeler. A 10.6 micron laser beam emanating from a continuous wave carbon dioxide laser and containing a small amount of visible light to visualize the beam was passed through the focusing apparatus and the beam width in the irradiation plane was adjusted to 635 microns. At these settings, the bouncing of the hot dogs as they passed through the peeler caused no significant change in the beam width impinging on the surface of the hot dog. The laser output was adjusted to 370 watts and a string of hot dogs was passed through the peeler at 64 meters per minute. The instantaneous power equates to about 117 kw/cm$^2$, while the energy density delivered equates to about 54 Joules/cm$^2$. The casing was vaporized not only from the cylindrical body of the hot dogs, but also from at least approximately one half of the exposed contour of each of the rounded ends of the hot dogs, without causing any damage to the hot dogs themselves. The split casings were then removed from the hot dogs by conventional means.

Our invention is not restricted solely to the description provided above, but encompasses all applications envisaged by the following claims.

We claim:

1. A method of removing a carbon-based casing from a heat-sensitive food product without causing substantial damage to said food product, comprising the steps of:
   longitudinally transporting said food product in relative motion with a laser beam to vaporize an elongated slit in said casing; and
   pulling said casing from said food product.
2. A method in accord with claim 1, wherein said laser beam projects continuous infrared radiation having a wavelength in the range of 1 to 15 microns.
3. A method in accord with claim 1, wherein said laser beam projects continuous infrared radiation in the range of 6 to 12 microns.
4. A method in accord with claim 1, wherein said laser beam projects continuous infrared radiation having a wavelength of 10.6 microns.
5. A method in accord with claim 1, wherein said laser beam is applied to said casing at an applied energy density in the range of 20 to 60 joules per square centimeter.
6. A method in accord with claim 1, wherein said laser beam is applied to said casing at an applied energy density of about 54 joules per square centimeter.
7. A method in accord with claim 1, wherein said food product is a sausage.
8. A method in accord with claim 7, wherein said laser beam is focused nominally at the surface of said sausage at a focal length in the range of 6.3 to 51 centimeters.
9. A method in accord with claim 7, wherein said laser beam is focused nominally at the surface of said sausage at a focal length of about 25 centimeters.
10. A method in accord with claim 7, wherein said laser beam is focused nominally at the longitudinal center of said sausage at a focal length in the range of 6.3 to 51 centimeters.
11. A method in accord with claim 7, wherein said casing is cellulose.

* * * * *